(12) United States Patent
Dusanapudi et al.

(10) Patent No.: US 8,832,502 B2
(45) Date of Patent: Sep. 9, 2014

(54) HARDWARE VERIFICATION USING ACCELERATION PLATFORM

(75) Inventors: Manoj Dusanapudi, Bangalore (IN); Wisam Kadry, Haifa (IL); Shakti Kapoor, Austin, TX (US); Dimtry Krestyashyn, Haifa (IL); Shimon Landa, Kiryat Yam (IL); Amir Nahir, Kfar Vitkin (IL); John Schumann, Austin, TX (US); Gil Eliezer Shurek, Haifa (IL); Vitali Sokhin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 13/557,238

(22) Filed: Jul. 25, 2012

(65) Prior Publication Data

US 2014/0032966 A1   Jan. 30, 2014

(51) Int. Cl.
*G06F 11/00* (2006.01)

(52) U.S. Cl.
USPC .......................................................... 714/33

(58) Field of Classification Search
CPC ... G06F 11/2236; G06F 11/26; G06F 11/261; G06F 11/263
USPC .................... 714/25, 32, 33, 38.1; 703/13, 14
See application file for complete search history.

(56) References Cited

U.S. PATENT DOCUMENTS

| | | | | |
|---|---|---|---|---|
| 5,784,550 | A * | 7/1998 | Brockmann et al. | 714/33 |
| 6,845,440 | B2 * | 1/2005 | Thompson et al. | 711/220 |
| 7,373,619 | B2 * | 5/2008 | Johnson | 716/136 |
| 7,480,602 | B2 * | 1/2009 | Duffie et al. | 703/13 |
| 7,945,888 | B2 | 5/2011 | Adir et al. | |
| 2006/0112257 | A1 * | 5/2006 | Undy et al. | 712/1 |
| 2006/0155525 | A1 * | 7/2006 | Aguilar et al. | 703/26 |

* cited by examiner

*Primary Examiner* — Scott Baderman
*Assistant Examiner* — Joseph Kudirka
(74) *Attorney, Agent, or Firm* — Ziu Glazberg

(57) ABSTRACT

A method includes executing a first post-silicon testing program by a reference model. During the execution of the first post-silicon testing program, one or more test-cases are generated. The first post-silicon testing program is executed in an offline generation mode. During execution of the first post-silicon testing program each test case is generated in a different memory location. After the execution, generating a second post-silicon testing program that is configured to execute the one or more test-cases. The method further includes executing the second post-silicon testing program on an acceleration platform.

16 Claims, 3 Drawing Sheets

HARDWARE VERIFICATION USING ACCELERATION PLATFORM

TECHNICAL FIELD

The present disclosure relates to verification in general, and to hardware verification in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware of a marketed product may be expensive to fix, as patching it requires call-back of the computerized device. Hence, many developers of computerized devices invest a substantial portion of the development cycle to discover erroneous behaviors of the computerized device.

The target computerized system may be a processor, a microprocessor, an electronic circuit, an integrated circuit, a chipset, a computerized device comprising a processor or the like. Testing such devices may comprise one or more pre-silicon stages and/or one or more post-silicon stages.

During the pre-silicon stages, devices are generally tested in a computerized environment simulating the functionality of the devices, such as using HDL simulator, and hardware accelerators. In pre-silicon stages, the target computerized system may be described using a descriptive language, such as for example Verilog or VHDL.

Post-silicon validation and debug is generally the last step in the functional verification of a computerized device. Post-silicon validation tests occur on the actual devices running at-speed in commercial, real-world system boards.

BRIEF SUMMARY

One exemplary embodiment of the disclosed subject matter is a computer-implemented method comprising: executing a first post-silicon testing program by a reference model, wherein during said executing the first post-silicon testing program one or more test cases are generated; generating a second post-silicon testing program that is configured to execute the one or more test-cases; and executing the second post-silicon testing program on an acceleration platform.

Another exemplary embodiment of the disclosed subject matter is a computerized apparatus having a processor, the processor being adapted to perform the steps of: executing a first post-silicon testing program by a reference model, wherein during said executing the first post-silicon testing program one or more test cases are generated; generating a second post-silicon testing program that is configured to execute the one or more test cases; and wherein said computerized apparatus is operatively coupled to an acceleration platform which is configured to execute the second post-silicon testing program.

Yet another exemplary embodiment of the disclosed subject matter is a computer program product comprising a non-transitory computer readable medium retaining program instructions, which instructions when read by a processor, case the processor to performs the steps of: executing a first post-silicon testing program by a reference model, wherein during said executing the first post-silicon testing program one or more test cases are generated; generating a second post-silicon testing program that is configured to execute the one or more test cases; and executing the second post-silicon testing program on an acceleration platform.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
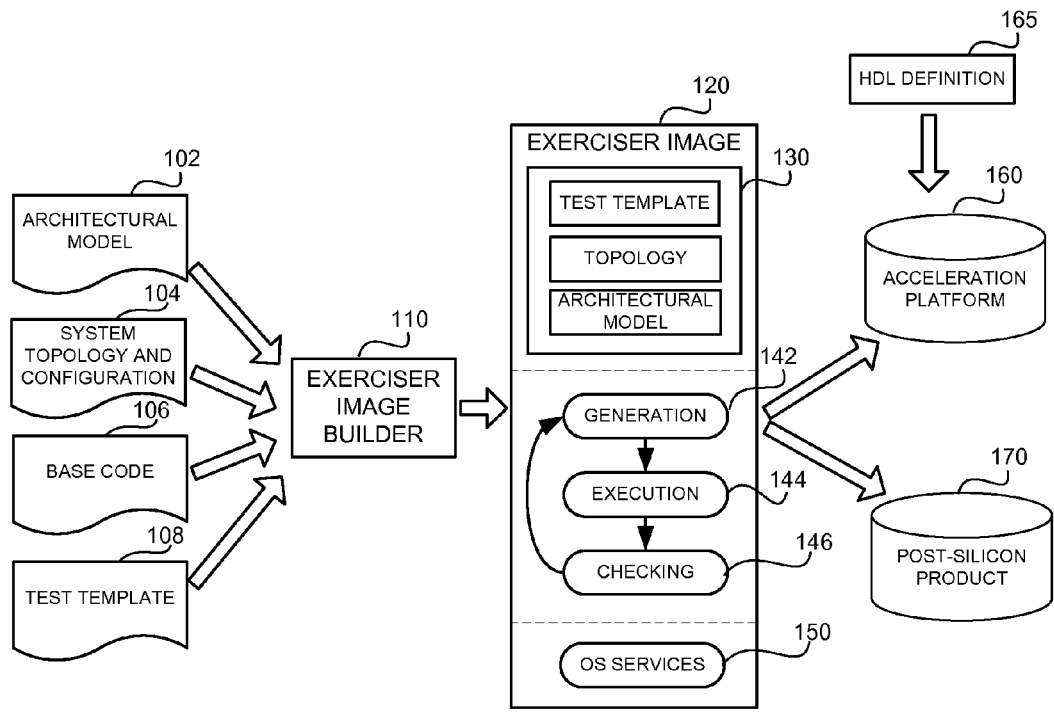
FIGS. 1A-1B show illustrations of computerized environments in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In the present disclosure, fabricated target computerized system may be referred to as a circuit, silicon, processor, hardware device or simply device.

The post-silicon stage may refer to a stage once the target computerized system has been fabricated. The target computerized system is generally referred to as post-silicon product. For example, the post-silicon stage may be after the target computerized system is produced in accordance with a description provided in a descriptive language. It will be noted that the circuit may be different than a finalized product, such as for example comprising only a chip without a casing, being assembled manually, being only partially assembled, a manufactured wafer, or the like.

Modern chips may comprise hundreds of thousands of logic elements and a large number of functionalities and features. It is therefore highly time consuming to thoroughly test the chip and verify its functional correctness. On the other hand, due to business-related reasons, it may be of high importance that the chip is released on time without undue delays. The time window that is thus available for testing is bounded by receiving the device from the semiconductor fabrication plant (FAB) on the one hand, and the expected release date on the other hand.

An exerciser is a post-silicon testing program useful for verification. An exerciser is a program that is configured to be loaded to a post-silicon system and be executed by the system. Once executed, the exerciser repeatedly generates test cases, executes them, and checks their behavior or results. The post-silicon system is a "bare metal platform" providing no Operating System (OS) functionality. Therefore, the exerciser may require comprise additional layers of software (e.g., as provided by an OS) to be used when generating a test-case.

One technical problem dealt with by the disclosed subject matter is to test an exerciser without the use of a post-silicon product.

Another technical problem is to utilize an acceleration platform in a relatively efficient manner. The disclosed subject matter generally provides for an relatively efficient utilization of an expensive acceleration platform while running post-silicon testing programs (i.e., exercisers).

The "acceleration platform" is a hardware-based platform that is capable of simulating an operation by a circuit design (e.g., defined using Verilog, VHDL or similar descriptive language). An acceleration platform is generally faster than HDL simulator, which is a software-based HDL simulator. In addition, generally, an acceleration platform has reduced observability of states of the circuit with respect to HDL simulators. An acceleration platform is generally considered an expensive resource that should be used efficiently.

One technical solution is to simulate operation of the exerciser using a reference model. During execution by the reference model, test cases may be generated and executed. The test-cases, and optionally results of executing the test-cases, may be extracted and used to create a reduced exerciser which is capable of executing the already generated test cases and check their results. The reduced exerciser may be loaded onto an acceleration platform for execution.

A reference model is software-based simulator of the circuit design. The reference model is not based upon the HDL from which the circuit is fabricated, as opposed to HDL simulators and acceleration platforms, which simulate an operation of a circuit based on its HDL definition.

One technical effect is a reduction in total execution time by the acceleration platform. Exercisers spend a significant portion of their computation cycles in generating the test cases. Empirical results suggest that about 70% of the cycles are spent in performing the generation task. By performing generation in an off-platform manner, about 70% of the cycles are not executed by the acceleration platform, and therefore its cycles may be utilized in executing the test-cases rather than in generation thereof.

Another technical effect is to utilize acceleration platforms as a replacement of the post-silicon product for checking the exerciser. In order to reduce time required for post-silicon verification, the exerciser may be utilized with respect to an acceleration platform or a similar hardware-based simulation platform. By simulating execution of the exerciser on the acceleration platform, bugs may be determined in an earlier stage than the post-silicon stage. Detected bugs may be bugs in the exerciser that need to be fixed in order for the post-silicon verification to be performed in an adequate manner.

Yet another technical effect is that utilizing acceleration platforms for executing the exerciser becomes feasible. Additional Software Layers (ASLs) which may be comprised by the exerciser may reduce likelihood of feasibility of executing the exerciser by the acceleration platform. The ASL may be used to provide the generation phase of the exerciser with infrastructure services, such as provided by the OS (e.g., interrupt handlers, address translation, memory allocation, and the like). Execution of the ASL may require a substantial amount of cycles and may thus be associated with high costs in terms of resource utilization. The disclosed subject matter allows to avoid executing the ASL by the acceleration platform.

Referring now to FIG. 1A, showing an illustration of a computerized environments in accordance with some exemplary embodiments of the disclosed subject matter.

An Exerciser Image Builder 110 may be configured to generate an Exerciser Image 120. Exerciser Image Builder 110 may be a computerized tool, such as implemented in hardware, software, a combination thereof, or the like. Exerciser Image Builder 110 may be configured to take different inputs as data which based thereon Exerciser Image 120 may be built.

In some exemplary embodiments, Architectural Model 102 may be provided as input, and portions thereof may be inserted to a Data Section 130 of Exerciser Image 120. Architectural model 102 may be utilized by Exerciser Image 120 to generate test cases that invoke different architectural aspects of the target device. Additionally or alternatively, System Topology and Configuration 104 may be provided as input and portions thereof may be retained in Data Section 130. Topology and configuration information may be utilized by Exerciser Image 120 to generate test cases that test different aspects of the topology and configuration of the target device. Additionally or alternatively, Test Template 108 or a plurality of similar templates may be provided as input and may be retained in Data Section 130 to allow Exerciser Image 120 to perform generation based upon abstract outline of operations provided by the Test Template 108. Additionally or alternatively, Base Code 106 may be provided as input. Base Code 16 may comprise program instructions to be added to Exerciser Image 120. In some exemplary embodiments, Exerciser Image 120 may be based on Base Code 106. The program instructions may be operative to perform generation-execution-checking loop (142, 144, 146). Additionally or alternatively, Base Code 106 may comprise program instruction providing OS services, such as OS Services 150.

In some exemplary embodiments, Exerciser Image Builder 110 may be configured to manipulate any input provided to it before storing corresponding data in Data Section 130. In one embodiment, Exerciser Image Builder 110 may strip down information that is not needed by the Exerciser Image 120 and/or may pre-calculate information to reduce amount of data to be retained in the binary image.

In some exemplary embodiments, Exerciser Image 120 may comprise Data Section 130 that may retain useful information such as test template based upon generation may be performed, topology and configuration information, architectural model information or the like.

In some exemplary embodiments, Exerciser Image 120 may comprise program instructions designed to cause the target device to repeatedly perform generation of a test case (142), execution of the test case (144) and checking results of executing the test case (146). Checking operations (146) may be based on consistency checks. As an example, the same test case may be executed a plurality of times, and the results may be compared for consistency.

Exerciser Image 120 may comprise OS Services 150, an Additional Software Layer (ASL), useful for providing the Exerciser Image 120 with functionality that is not provided by a bare-metal product, such as the target device. OS Services 150 may provide functionalities such as interrupt handlers, address translation, memory management. In some exemplary embodiments, OS Services 150 may be utilized for test case generation (142).

Exerciser Image 120 may be loaded onto a platform, such as Post-Silicon Product 170. Exerciser Image 120 may be loaded by loading the binary to a memory unit of the platform. Exerciser Image 120 may be executed by the Post-Silicon Product 170 and may cause Post-Silicon Product 170 to generate test-cases, execute and check their execution results, thereby enabling verification of the Post-Silicon Product 170.

Exerciser Image 120 may be alternatively loaded to an Acceleration Platform 160 which simulates, in a hardware-based manner, the Post-Silicon Product 170. Acceleration Platform 160 may be configured to simulate operation of a circuit design based upon an HDL definition thereof (165), such as the HDL from which Post-Silicon Product 170 is fabricated.

Figure 1B:
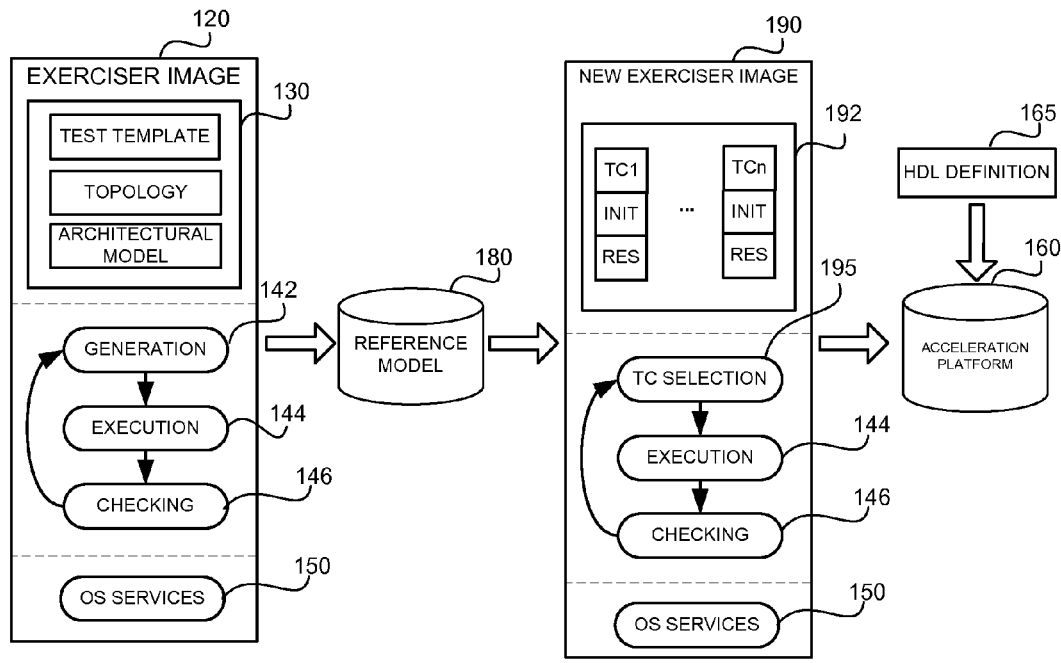

Referring now to FIG. 1B, showing an illustration of a computerized environments in accordance with some exemplary embodiments of the disclosed subject matter.

Exerciser Image 120 may be loaded to a Reference Model 180 for execution. Reference Model 180 may be an alternative platform which is defined to provide a simulation of the circuit design and is not directly based on the HDL definition 165. In some cases, Reference Model 180 is programmed by a circuit designer or by a user providing a specification of the circuit before HDL definition commences. As Reference Model 180 may be programmed in any manner, and is not restricted to being defined using an HDL, it may be easier to program the reference model. Additionally or alternatively, as the HDL definition 165 and the Reference Model 180 are defined in an independent manner, and as both are supposed to capture the same functional behavior, Reference Model 180 may be utilized for checking correctness of the HDL definition 165.

In some exemplary embodiments, Exerciser Image 120 may be configured in different modes. A first mode may be an online generation mode, in which test cases are generated, executed and checked in an online manner. A second mode may be an offline generation mode, in which test cases are generated off-platform and can be later executed by the platform. Activities performed on a different platform than the platform being used for verification are referred to as being performed off-platform. In some exemplary embodiments, generation may be performed off-platform to generate test-cases (e.g., on Reference Model 180), and execution thereof may be performed on-platform (e.g., on Acceleration Platform 160).

Exerciser Image 120 may be executed in the offline generation mode by Reference Model 180. During such execution, test cases may be generated, including their initial values, and optionally the test cases are executed and results of such execution may be retained for correctness checking purposes. Based on the execution of Exerciser Image 120 a New Exerciser Image 190 may be generated. New Exerciser Image 190 may comprise Data Section 192 in which the different test cases (TCs) are retained, as well as the initial values and excepted results of executing each test case.

Each test case may comprise a set of instructions for the target device to perform. In some exemplary embodiments, Reference Model 180 executing Exerciser Image 120 may generate each test case, together with initial values information, in a different memory location. In-place generation of test cases may reduce copying overhead, as each test case is generated in a different location, there's no need to copy the information but rather pointer manipulation may be sufficient to change between test cases. Data Section 192 may be determined as a dump of the memory of the Reference Model 180.

In some exemplary embodiments, New Exerciser Image 190 may comprise instructions causing the target device to perform test case selection (195), execution of the test case (144) and checking the results (146).

TC Selection 195 may be performed by manipulating a pointer to point to the selected test case. Additionally or alternatively, initial values of the target device when executing the test case may be set by manipulating a second pointer to point to the initial values table of the test case. Additionally or alternatively, checking results 146 may be enabled by checking actual results with expected results. Expected results may be pointed to using a third pointer which may be manipulated with each test case being selected, to point to the appropriate result table in Data Section 192.

Checking step 146 may comprise checking for consistency of results (e.g., repeated executions provide the same results) and correctness (e.g., the results received are correct as they are the same as expected).

It will be noted that in some exemplary embodiments New Exerciser Image 190 may omit OS Services 150 and similar ASL as the generation step (142) may not be performed and therefore there may be no requirement to provide such ASL functionality.

New Exerciser Image 190 may be loaded onto Acceleration Platform 160 for execution thereby performing test case selection (195), execution of the test case (144) and checking results of the execution (146) repeatedly. In some exemplary embodiments, off-platform generation of test cases is performed thereby increasing utilization of the Acceleration Platform 160 and focusing its use on verifying the functionality and not on performing preparation operations (e.g., test case generation). In some exemplary embodiments, the Exerciser Image 120 is the same image to be loaded to Post-Silicon Product 170 and therefore its operation, including test case generation and execution thereof, is being tested as well prior to having Post-Silicon Product 170 available.

In some exemplary embodiments, Exerciser Image 120 and New Exerciser Image 190 may be post-silicon testing programs which are configured to be executed on a bare metal platform.

Figure 2:
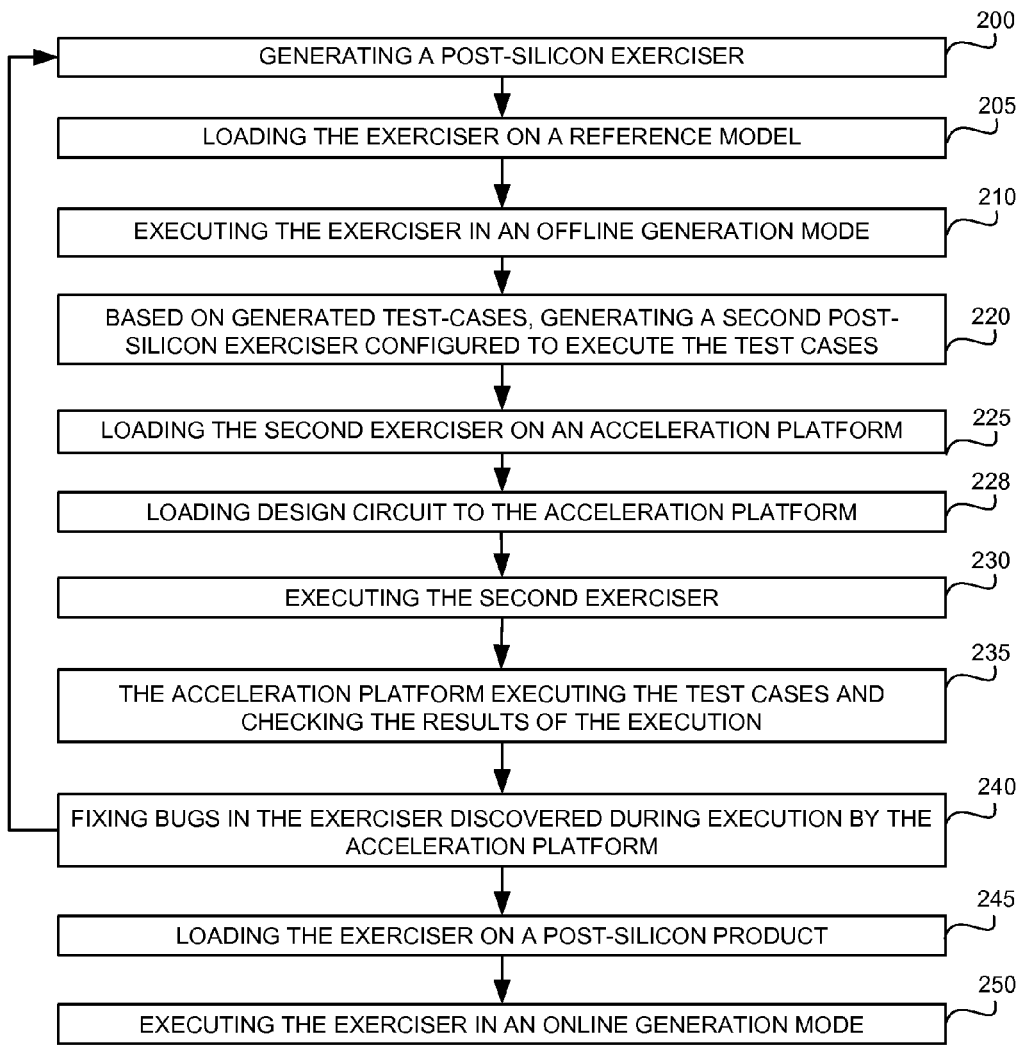
FIG. 2 shows a flowchart diagram of steps in a method for verification using an acceleration platform, in accordance with some exemplary embodiments of the disclosed subject matter.

Referring now to FIG. 2 showing a flowchart diagram of steps in a method for verification using an acceleration platform, in accordance with some exemplary embodiments of the disclosed subject matter.

In Step 200, a post-silicon exerciser, such as Exerciser Image 120, may be built. Generation may be based on variety of inputs, such as but not limited to 102-108 of FIG. 1A. The post-silicon exerciser may be configured to be executed on a bare-metal platform. In some exemplary embodiments, the exerciser may be configured to be executed in an offline generation mode and an online generation mode.

In Step 205, the exerciser may be loaded onto a reference model, such as 180. The reference Model may be a partially software-implemented simulator configured to simulate operation of a target circuit design.

In Step 210, the exerciser may be executed in an offline generation mode. During execution in the offline generation mode, the exerciser may generate test cases (e.g., a set of instructions to the target circuit design and initial values of the registers thereof) and store the test-cases for execution by a different platform than the platform used for generation. In some exemplary embodiments, the reference model may be used to execute the exerciser in the offline generation mode. In some exemplary embodiments, during the offline generation mode, the exerciser may execute the test cases and the results may also be retained to be used as expected results of the test cases.

In some exemplary embodiments, during offline generation mode, each test case may be generated in a different memory space, thereby avoiding overwriting a test case by a newly generated test case. The memory may be dumped, and execution of each test case may be performed by pointer manipulation, such as by modifying the instruction pointer to point to the test case to be executed. Similarly, results may be stored in different memory spaces, and the information may be accessed using pointer manipulation.

It will be noted that there may be different number of instructions to each test case, and that there may be a maximal threshold size of a test case. In some exemplary embodiments, a first test case is generated in a first location, and a next test case may be generated in a second location which is an offset from the first location by at least the maximal threshold size.

In Step 220, a second post-silicon exerciser may be generated. The second post-silicon exerciser, such as New Exerciser Image 190, may be configured to execute the test cases which were generated in the offline generation mode. The second post-silicon exerciser may comprise the generated test cases in a Data Section 192. In some exemplary embodiments, the test cases may be hardcoded into the second exerciser. The second exerciser may be configured to iteratively select a test case for execution, execute the test case, and check results of execution, optionally based on expected results (i.e., check for correctness) and/or with respect to previous executions of the same test case by the second exerciser (i.e., check for consistency).

In Step 225, the second exerciser may be loaded on an acceleration platform, such as 160 of FIG. 1A.

In Step 228, the acceleration platform may be loaded with an HDL definition describing the target circuit design, such as 165 of FIG. 1A. In some exemplary embodiments, the acceleration platform may be a general-purpose hardware-based HDL simulator, which simulates execution of a circuit given its HDL definition.

In Step 230, the second exerciser may be executed.

In Step 235, the acceleration platform may execute the test cases and may check them without performing any generation and using off-platform generated test-cases. Additionally or alternatively, the results of execution may be checked for correctness and/or correctness and/or the like.

In Step 240, bugs which may be discovered in the exerciser may be fixed. In some exemplary embodiments, bugs may be fixed manually by a user, such as an engineer. Bugs may include, for example, generation of invalid test-cases or test-case generation which is not properly biased in accordance with heuristics and/or with the input provided to the exerciser. Additionally or alternatively, bugs in the execution and checking functionalities may also be discovered. In some exemplary embodiments, bugs may be fixed by directly modifying the exerciser or by modifying the generation process which generates the exerciser (e.g., Step 200).

In some exemplary embodiments, In Step 240, bugs in the target circuit design may be discovered and fixed. Bugs in the target circuit design may be fixed before having a post-silicon product.

In some exemplary embodiments, Steps 200-240 may be performed repeatedly, such as with respect to different HDL version, to different exerciser versions or the like. Optionally, the exerciser may not be generated a plurality of times but rather the same exerciser may be manually manipulated and reused in different iterations of the loop.

In Step 245, the exerciser may be loaded on a post-silicon product. In some exemplary embodiments, the post-silicon product may not be available when Steps 200-240 were originally performed, thereby fixing bugs (Step 240) may be have performed in an earlier stage and therefore less time may be required for verification.

In Step 250, the exerciser may be executed by the post-silicon product in an online generation mode, in which generation and execution are performed on the same platform.

Figure 3:
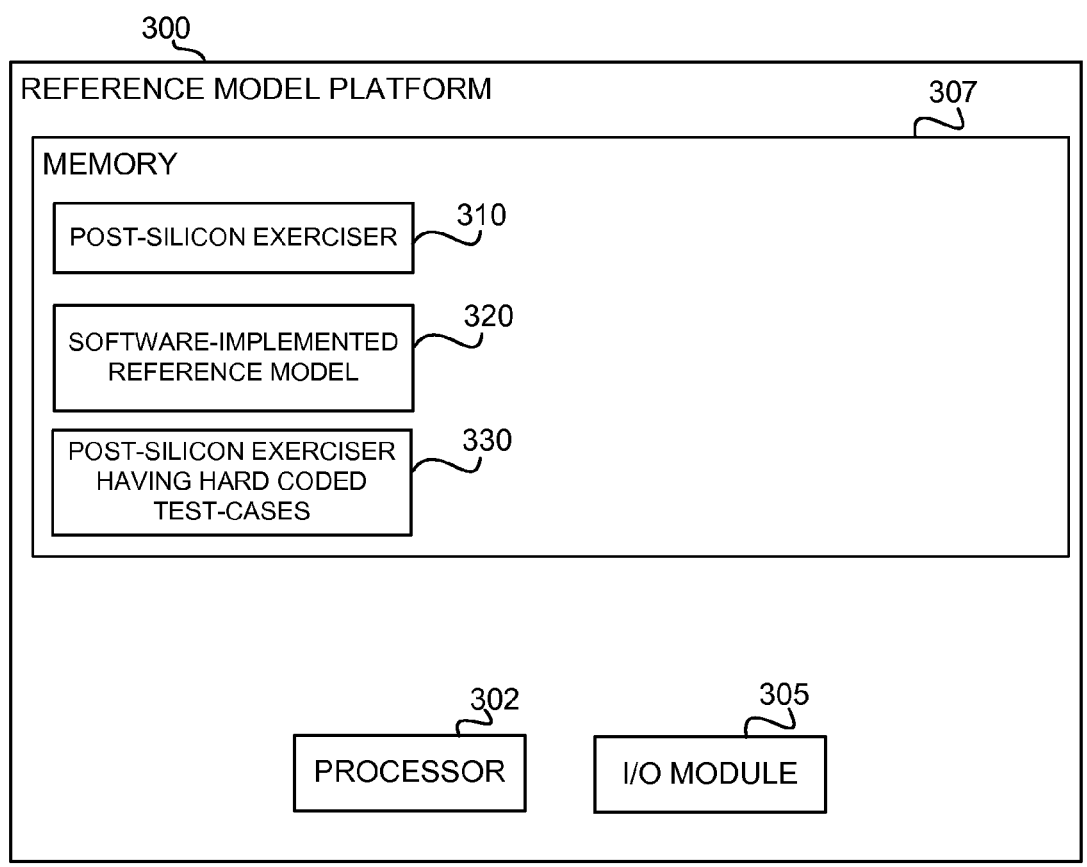
FIG. 3 shows a block diagram of components of a system for verification using an acceleration platform, in accordance with some exemplary embodiments of the disclosed subject matter.

Referring now to FIG. 3 showing a block diagram of components of a system for verification using an acceleration platform, in accordance with some exemplary embodiments of the disclosed subject matter.

In some exemplary embodiments, an Reference Model Platform 300 may comprise a Processor 302. Processor 302 may be a Central Processing Unit (CPU), a microprocessor, an electronic circuit, an Integrated Circuit (IC) or the like. Processor 302 may be utilized to perform computations required by Reference Model Platform 300 or any of its subcomponents. Reference Model Platform 302 may be configured to simulate execution of a program by a target circuit design.

In some exemplary embodiments of the disclosed subject matter, Reference Model Platform 300 may comprise an Input/Output (IO) Module 305. IO Module 305 may be utilized to provide an output to and receive input from a user. IO Module 305 may be operative to provide a log of execution to a user, such as a model designer, a QA staff member, a verification engineer, or the like. Additionally or alternatively, IO Module 305 may enable Reference Model Platform 300 to load programs from external source and transfer information to external sources, such as transferring to an acceleration platform an exerciser image generated by Reference Model Platform 300 (e.g., New Exerciser Image 190 of FIG. 1B).

In some exemplary embodiments, Reference Model Platform 300 may comprise a Memory Unit 307. Memory Unit 307 may be a short-term storage device or long-term storage device. Memory Unit 307 may be a persistent storage or volatile storage. Memory Unit 307 may be a disk drive, a Flash disk, a Random Access Memory (RAM), a memory chip, or the like. In some exemplary embodiments, Memory Unit 307 may retain program code operative to cause Processor 302 to perform acts associated with any of the subcomponents of Reference Model Platform 300. In some exemplary embodiments, Memory Unit 307 may retain program code operative to cause Processor 302 to simulate operation by the target circuit design.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

A Software-implemented Reference Model 320 may comprise program code operative to cause Processor 302 to simulate operation of the target circuit design.

Software-implemented Reference Model 320 may be utilized to simulate execution by the target circuit design of a Post-Silicon Exerciser 310. During said execution, test-cases may be generated by Post-Silicon Exerciser 310.

Based on the test-cases generated by Post-Silicon Exerciser 310, Post-Silicon Exerciser 330 may be generated. In some exemplary embodiments, Post-Silicon Exerciser 330 may have the generated test-cases hard-coded into it thereby allowing execution of test-cases without requiring to generate them online. In some exemplary embodiments, Post-Silicon Exerciser 310 may be configured to generate Post-Silicon Exerciser 330 when executed in an offline generation mode.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
executing a first post-silicon testing program by a reference model, wherein during said executing the first post-silicon testing program one or more test-cases are generated, wherein said first post-silicon testing program is executed in an offline generation mode, in which said generating is performed, wherein during said executing of the first post-silicon testing program each test case is generated in a different memory location;
generating a second post-silicon testing program that is configured to execute the one or more test-cases; and
executing the second post-silicon testing program on an acceleration platform.

2. The computer-implemented method of claim 1, wherein said executing the first post-silicon testing program is performed off-platform by a computer having a processor and memory.

3. The computer-implemented method of claim 1, wherein said second post-silicon testing program is configured to check consistency of results of executing the one or more test cases.

4. The computer-implemented method of claim 1,
wherein during said executing the first post-silicon testing program expected results are determined,
wherein said second post-silicon testing program is configured to check results of executing the one or more test cases with the expected results according to the reference model.

5. The computer-implemented method of claim 1, wherein during said executing of the first post-silicon testing program results of each test case are stored in a different memory location.

6. The computer-implemented method of claim 5, wherein said executing the second post-silicon program is performed by pointing to memory locations associated with the one or more test cases.

7. The computer-implemented method of claim 1, wherein said executing the second post-silicon testing program comprises: selecting a test case to be executed, executing the test case, and checking results of executing the test case.

8. A computerized apparatus having a processor, the processor being adapted to perform the steps of:
executing a first post-silicon testing program by a reference model, wherein during said executing the first post-silicon testing program one or more test cases are generated, wherein said first post-silicon testing program is executed in an offline generation mode, in which said generating is performed, wherein during said executing of the first post-silicon testing program each test case is generated in a different memory location;
generating a second post-silicon testing program that is configured to execute the one or more test cases; and
wherein said computerized apparatus is operatively coupled to an acceleration platform which is configured to execute the second post-silicon testing program.

9. The computerized apparatus of claim 8, wherein said second post-silicon testing program is configured to check consistency of results of executing the one or more test cases.

10. The computerized apparatus of claim 8,
wherein during said executing the first post-silicon testing program expected results are determined,
wherein said second post-silicon testing program is configured to check results of executing the one or more test cases with the expected results according to the reference model.

11. The computerized apparatus of claim 8, wherein during said executing of the first post-silicon testing program results of each test case are stored in a different memory location.

12. The computerized apparatus of claim 11, wherein said acceleration platform is configured to execute the one or more test cases based on a direction by the second post-silicon program to point to memory locations associated with the one or more test cases.

13. The computerized apparatus of claim 8, wherein the second post-silicon testing program is configured to cause said acceleration platform to perform the steps of: selecting a test case to be executed, executing the test case, and checking results of executing the test case.

14. A computer program product comprising a non-transitory computer readable medium retaining program instructions, the instructions when read by a processor, cause the processor to perform the steps of:
executing a first post-silicon testing program by a reference model, wherein during said executing the first post-silicon testing program one or more test cases are generated, wherein said first post-silicon testing program is executed in an offline generation mode, in which said generating is performed, wherein during said executing of the first post-silicon testing program each test case is generated in a different memory location;
generating a second post-silicon testing program that is configured to execute the one or more test cases; and
executing the second post-silicon testing program on an acceleration platform.

15. The computer program product of claim 14, wherein said executing the first post-silicon testing program is performed off-platform by a computer having a processor and memory.

16. The computer program product of claim 14, wherein the second post-silicon testing program is configured to cause said acceleration platform to perform the steps of: selecting a test case to be executed from the one or more test cases, executing the selected test case, and checking results of executing the test case.

* * * * *